Dec. 17, 1968          H. O. BROWN          3,416,536

APPARATUS FOR STRIPPING BRUSSELS SPROUTS

Filed July 6, 1965          2 Sheets-Sheet 1

United States Patent Office 3,416,536
Patented Dec. 17, 1968

3,416,536
APPARATUS FOR STRIPPING BRUSSELS SPROUTS
Hugo O. Brown, 2434 E. Santa Ysabel, Fullerton, Calif. 92631
Filed July 6, 1965, Ser. No. 469,644
13 Claims. (Cl. 130—30)

ABSTRACT OF THE DISCLOSURE

An apparatus and method for severing Brussels sprouts from their stalks includiung a chuck member having an edge. A stalk is inserted into the chuck member, and periodically operating means, such as a plurality of rotating severing members, cause the base of the sprouts to bear against the edge of the chuck member and be severed from the stalk.

---

This invention relates to an apparatus and method for removing Brussels sprouts from their stalks and more particularly to an apparatus and process for severing the sprouts from their stalks by mechanical means thereby requiring a minimum of human manual labor.

The Brussels sprouts plant forms an erect stalk about one to two feet tall along which buds develop into small heads or sprouts. These sprouts, because of their unique growth habit, are not easily removed by a machine. Typically, the matured sprouts are removed from their stalks manually by hand in the fields or after the stalks have been cut. The manual hand stripping of the sprouts from the stalks adds greatly to the cost thereof.

Various apparatus and methods have been devised for mechanically removing the sprouts from their stalks. Among these is an apparatus described in British Patent No. 956,028 published Apr. 22, 1964, wherein a cut stalk is fed through a hole in a board and subsequently engages a pair of rollers which pull the stalk through the board thereby shearing the sprouts from the stalk as the sprouts engage the periphery of the hole. Other machines have been devised utilizing rotating cutting blades coaxial with the stalk for shearing the sprouts from the stalk, while some means (typically rollers) is provided for pulling the stalk past the cutting blades. Examples of apparatus of this latter nature are found in British Patent No. 958,114 published May 13, 1964, and U.S. Patent No. 3,175,561. Although each of these prior apparatus provides a satisfactory means for removing the sprouts from the stalk and are more economical in the long run than removing the stalk by hand, each is characterized by undue mechanical complexity, bulkiness, and cost of manufacture and operation.

The present invention provides an improved apparatus and method for automatically removing Brussels sprouts from their stalks. Accordingly, it is an object of the present invention to provide a relatively simple and inexpensive apparatus and method for removing sprouts from their stalks.

It is a further object of the present invention to provide an improved and efficient Brussels sprouts stripper.

An additional object of the present invention is the provision of an improved method of removing Brussels sprouts from their stalks in an efficient and economical manner.

These and other objects, features and advantages of the present invention will be more apparent when considered in connection with the attached drawings in which:

FIG. 3 is a view of a portion of the apparatus shown in FIGS. 1 and 2.

According to a specific exemplary embodiment of the present invention, rotating means, such as wheels, having severing members, paddles or tines thereon engage the Brussels sprouts and sever them from their stalks. Exemplary apparatus for practicing the invention may include a variable opening chuck into which an end of the stalk is placed, and about which a plurality of said wheels are situated. As the stalk is forced through the chuck, the severing members sever the sprouts from the stalk. Biasing means may be provided for urging the wheels toward the stalk for optimally positioning the wheels with respect to various size stalks and sprouts.

Figure 1:
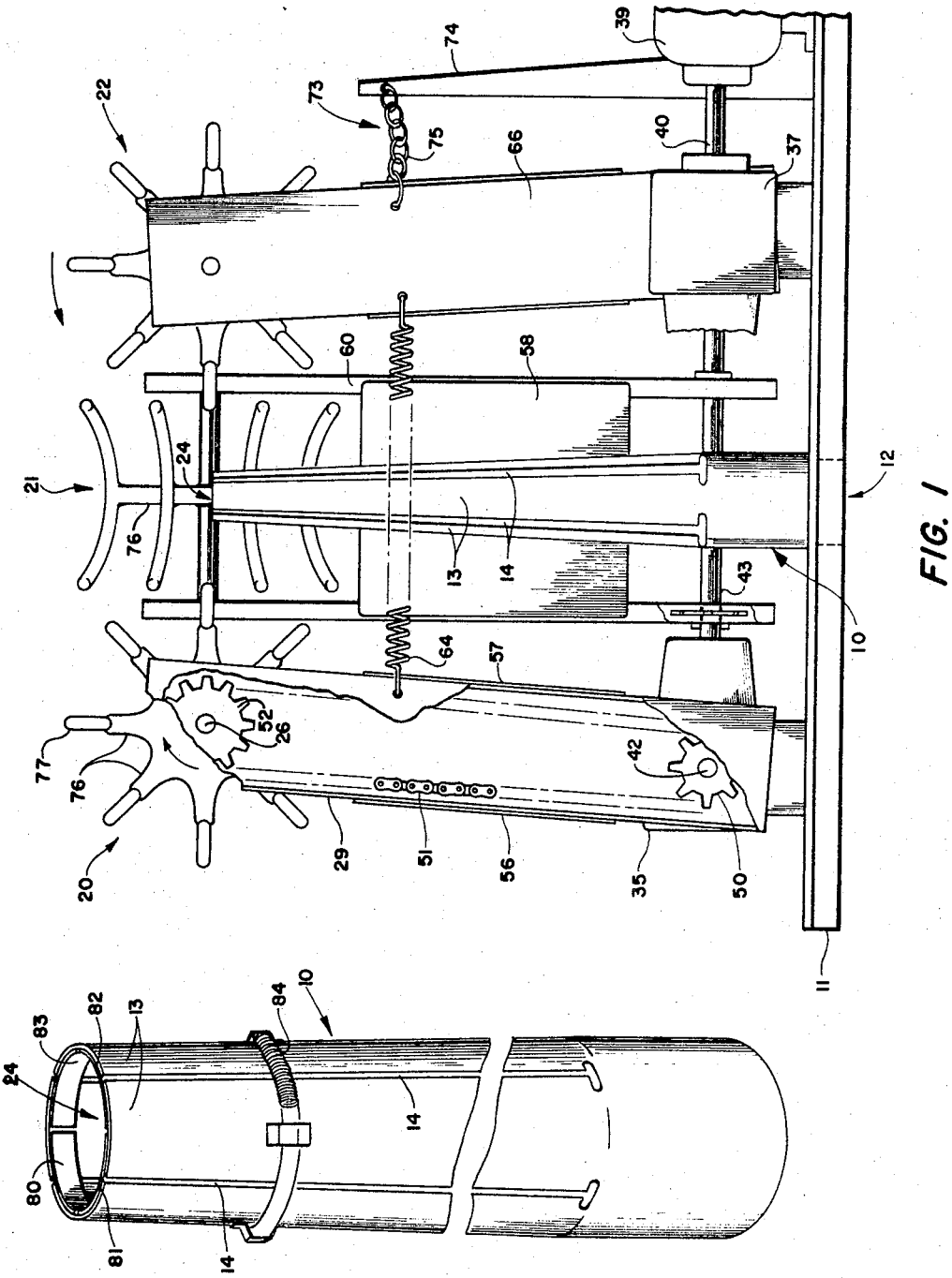
FIG. 1 is an elevational view of exemplary apparatus constructed in accordance with the teachings of the present invention.
Figure 2:
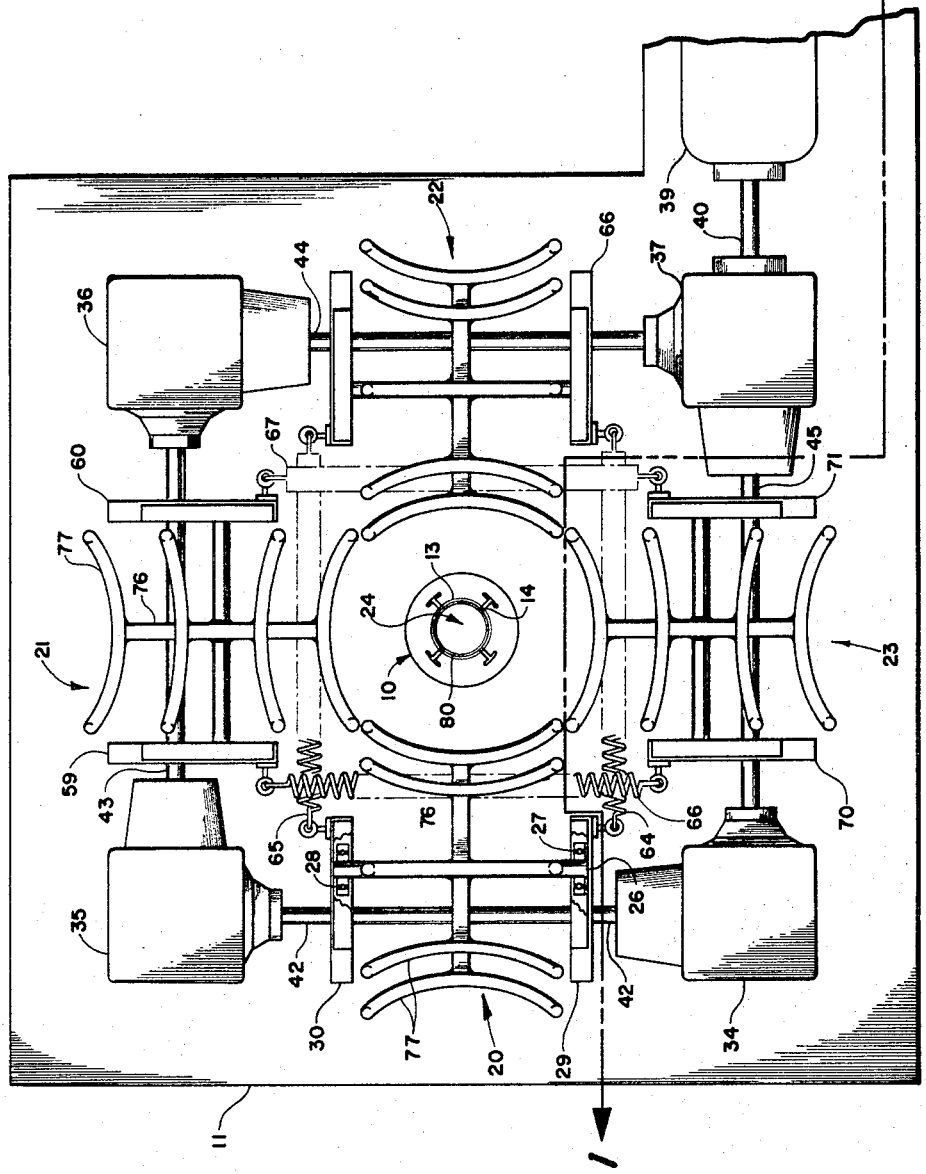
FIG. 2 is a top view of the apparatus shown in FIG. 1.

Turning now to the drawings, FIGS. 1 and 2 illustrate an exemplary apparatus constructed in accordance with the teachings of the present invention. FIG. 1 is a sectional view of FIG. 2 taken along the lines 1—1 in FIG. 2. A vertically disposed variable opening chuck 10 (shown in greater detail in FIG. 3), which is essentially frusto-conical in shape, is affixed to a base 11. An opening 12 is provided in the base 11 aligned with the lower end of the chuck 10. The chuck 10, which will be described in greater detail subsequently, may be formed from a suitable resilient metal tube, such as aluminum or steel and have jaws 13 separated by longitudinal slots 14 for allowing at least the upper portion of the chuck 10 to have a variable opening or diameter for accommodating various sizes of stalks. A plurality of rotatable wheels 20 through 23 are located near the upper opening 24 in the chuck 10 (wheel 23 is not seen in FIG. 1). Each of the wheels 20 through 23 is affixed to a rotatable shaft which is arranged in bearings in a pair of supporting arms. For example, the wheel 20 (see FIG. 2) is affixed to a shaft 26 which is rotatably mounted in bearings 27 and 28 in sheet metal supporting arms 29 and 30, respectively.

A plurality of gear boxes 43 through 37, such as right angle spiral gear boxes sold by Boston Gear, Boston, Mass., are mounted on the base 11 for transmitting rotary motion to the wheels 20 through 23. A suitable driving means 39, such as an electric or hydraulic motor, supplies power to one of the gear boxes, such as the gear box 37, through a shaft 40. A clutch, flexible coupling or other suitable means may be connected between the driving means 39 and gear box 37 if desired. The gear boxes 34 through 37 are interconnected by shafts 42 through 45. Each of the shafts 42 through 45 may be formed of two shorter shafts and a suitable coupling (such as a spline coupling) to facilitate interconnecting and aligning the gear boxes, if desired. The shafts 42 through 45 may extend through suitable bearings in the lower ends of each of the supporting arms, such as the shaft 42 extending through the arms 29 and 30. A suitable sprocket or pulley is affixed to each of the shafts 42 through 45 adjacent one of the supporting arms of each pair, and a chain or belt may be coupled between this sprocket or pulley and a similar one affixed to the central shaft of each wheel. For example, a sprocket 50 (FIG. 1) is affixed to the shaft 42, and is coupled by means of a chain 51 to a similar sprocket 52 affixed to the shaft 26 of the wheel 20. Each pair of supporting arms includes a similar arrangement for driving its respective wheel. The shafts 42 through 45 may be supported by pillow blocks or bearings if desired.

The pairs of supporting arms are affixed together and maintained in an aligned relationship by suitable braces. For example, the arms 29 and 30 (FIG. 1) are affixed together by sheet metal braces 56 and 57. A brace member 58 similar to member 57 is shown in greater detail interconnecting arms 59 and 60 in FIG. 1.

By the arrangement described above, each of the wheels 20 through 23 is movable inwardly and outwardly with respect to the chuck 10 about the axis of the respective drive shafts 42 through 45 associated therewith. In this manner, rotary motion is imparted to each of the wheels 20 through 23 while still allowing each of these wheels individually to move toward or away from a Brussels sprout stalk inserted in opening 24 in the chuck 10. The arms are selected of a length with respect to the length of the chuck 10 so that as the arms move inwardly or outwardly about the axis of their respective driving shafts, the upper ends of the arms (and hence the wheels) have only minimal up and down travel. This arrangement aids in maintaining the wheels 20 through 23 at optimum positions with respect to sprouts, the stalk of which has been inserted in the chuck 10.

In order to ensure that the wheels suitably engage the incoming Brussels sprouts, biasing means may be provided for urging each pair of arms toward the chuck 10. Suitable biasing means may take the form of springs 64 through 67 attached between respective supporting arms 29 and 68, 30 and 69, 59 and 70, and 60 and 71.

In order to prevent the arms from moving too far inwardly, restraining means may be provided. For example, a single (for simplicity of illustration) restraining means 73 is shown attached to arm 66 in FIG. 1, it being understood that similar means may be provided for each pair of supporting arms. The restraining means 73 may take the form of an upright standard 74 connected by a chain 75 of suitable length to a hole or fastener in arm 66. The standard 74 and chain 75 only allow the arm 66 to move a specific distance inwardly. Additionally, if desired, the arms 13 of the chuck 10 may be coupled with adjacent supporting arms to automatically move inwardly and outwardly with the movement of the adjacent arms.

The wheels 20 through 23 may take any one of various forms. Preferably, the wheels are arranged with severing members, paddles or tines which may intermesh with adjacent wheels as the wheels are moved toward the opening 24 in the upper end of the chuck 10. Each wheel may, for example, include a plurality of radial spokes 76 welded to its respective wheel shaft. Concave severing members or arms 77 essentially tubular in shape and bent in the form of segments of a circle are welded to the ends of the spokes 76 and are adapted to intermesh with the corresponding members of the adjacent wheels and to sever the Brussels sprouts from their stalks. The severing members 77 may be formed from metal rod stock and coated with a resilient material such as rubber or plastic. Rubber or plastic tubing may be slid over the members 77. Alternatively, the wheels 20 through 23 may be provided with radially disposed solid paddle members which are formed from rubber or a suitable plastic. For example, paddles formed from resilient rubber or plastic may be used. It is to be understood that a smaller or greater number of wheels may be provided, with three or more being preferable.

As shown in greater detail in FIGS. 2 and 3, the upper end of the chuck 10 includes a plurality of segments 80 through 83 which are affixed to the ends of respective ones of the arms 13. The segments aid in maintaining a solid circular surface at the opening 24 which has a rounded upper edge. It is not necessary that the edge be sharp. In order to ensure that the chuck will continue to conform to the stalks a coil spring 84 retained in brackets may be arranged around the chuck 10 toward the upper end thereof. The outward movement of the arms 13 of the chuck 10 may be restrained by providing elongated slots (not shown) in the segments 80 through 83 which engage pins affixed to the adjacent arms 13.

To remove Brussels sprouts from their stalks, the stalk, stripped or unstripped of its leaves, is inserted (preferably base first since the sprouts grow outwardly and upwardly) into the opening 24 of the chuck 10. As the stalk is moved into the chuck 10, the rotating wheels 20 through 23 move inwardly or outwardly to accommodate the size of the stalk and sever or strip the sprouts therefrom at the base of the sprouts. As the sprouts are stripped from the stalk, the stalk moves through the chuck 10 and the opening 12, with the sprouts falling on the outside of the chuck 10. A suitable collecting means, such as a trough or pan, may be located about the periphery of the chuck 10 for receiving the sprouts and conveying them away from the apparatus. The severing operation may take place in the field, or preferably at the packing plant in order that the sprouts may be immediately packed and frozen before they start to dry out.

The stalks may be pushed into the chuck by hand. If desired, the stalks may be forced into the chuck 10 by a suitable mechanical means, and/or, means (such as a pair of wheels) may be provided at the bottom of the opening 12 for pulling the stalk through the chuck 10.

It should be understood that if the wheels and severing members are sufficiently resilient, it is not necessary that the wheels be capable of moving inwardly and outwardly with respect to the chuck. In this event, the wheels may be affixed directly to the shafts between the driving members (such as the gear boxes 34 through 37).

It will be understood that although exemplary embodiments of the present invention have been disclosed and discussed, other applications and arrangements are possible and that the embodiments disclosed may be subjected to various changes, modifications and substitutions without necessarily departing from the spirit of the invention.

What is claimed is:

1. In a Brussels sprouts stripper for removing Brussels sprouts from their stalk, the improvement comprising
   a chuck member having a substantially circular opening in an end thereof for receiving said stalk,
   a plurality of rotating severing means arranged about said opening and having their axes of rotation transverse to the longitudinal axis of said chuck member,
   said rotating severing means each including a plurality of severing arms which engage sprouts in the vicinity of the stalk, and
   means for imparting rotary motion to said rotating severing means.

2. Apparatus as in claim 1 wherein
   four of said rotating severing means are provided around said opening in said chuck member,
   said chuck member is substantially frusto-conical in shape, and
   means are provided for urging said rotating severing means toward said opening in said chuck member.

3. A Brussels sprouts stripper for removing Brussels sprouts from their stalk comprising
   a base having an opening therein,
   a chuck having a variable diameter opening in one end thereof, said chuck being substantially tubular in shape,
   the other end of said chuck being affixed over said opening in said base,
   a plurality of rotating severing means arranged about the variable diameter opening in said chuck, said opening adapted to receive a stalk,
   said rotating severing means having a direction of rotation substantially parallel to the direction of insertion of said stalk into the variable diameter opening in said chuck,
   supporting members for supporting said rotating severing means for rotation and for maintaining said severing means in the vicinity of said variable diameter opening in said chuck,
   biasing means for urging said rotating severing means toward said variable diameter opening in said chuck, and
   means for imparting rotary motion to said rotating severing means.

4. A Brussels sprouts stripper as in claim 3 wherein four rotating severing means are provided about the periphery of said variable diameter opening in said chuck, each of said rotating severing means including a plurality of radially disposed severing members having arms substantially parallel to the axis of rotation thereof, biasing means connected with said chuck for urging said variable diameter opening to maintain a minimum diameter, but to expand as necessary as a stalk is fed through said variable diameter opening.

5. A Brussels sprouts stripper as in claim 4 wherein said severing members are comprised of a resilient material.

6. A Brussels sprouts stripper as in claim 4 wherein said severing members are covered with a resilient material.

7. A Brussels sprouts stripper as in claim 4 wherein the arms of said severing members are made of metal formed in the shape of a segment of a circle each being attached intermediate the ends thereof to a spoke member which is arranged on a shaft driven by said means for imparting rotary motion.

8. A Brussels sprouts stripper as in claim 3 wherein said rotating severing means each includes a plurality of paddle members radially extending from its axis of rotation.

9. A Brussels sprout stripper for removing Brussels sprouts from their stalk comprising chuck means having an opening therein for receiving said stalk, said chuck means being substantially in the form of an elongated tube frusto-conical in shape, a plurality of rotating severing members in the vicinity of said opening having their axes of rotation transverse to said stalks, said rotating severing members each including a plurality of severing arms arranged on the periphery thereof and arranged to be capable of intermeshing with the arms on adjacent severing members, and means for driving said rotating severing members.

10. A Brussels sprouts stripper as in claim 9 wherein said rotating severing members are held by support arms thereby allowing said severing members to move inwardly and outwardly with respect to staid opening, and means are attached to said support arms for biasing same to urge said severing members toward said stalk.

11. A Brussels sprouts stripper for removing Brussels sprouts from their stalk comprising means for receiving a Brussels sprout stalk, said means defining an edge for bearing against the base of the Brussels sprouts on said stalk, a plurality of rotating severing members in the vicinity of said edge having their axes of rotation transverse to said stalk, and means for driving said rotating severing members.

12. A Brussels sprouts stripper for removing Brussels sprouts from their stalk comprising means for receiving a Brussels sprout stalk, said means defining an edge for bearing against the base of Brussels sprouts on said stalk, rotating severing means near said edge having an axis of rotation transverse to said stalk for engaging said sprouts and causing the base of said sprouts to bear against said edge and be severed from said stalk, and means for driving said rotating severing means.

13. In a stripper for removing discrete edible growths from the stalk of a plant, the improvement comprising a chuck member having a substantially circular opening in an end thereof for receiving said stalk, a plurality of rotating severing means arranged about said opening and having their axes of rotation transverse to the longitudinal axis of said chuck member, said rotating severing means each including a plurality of severing arms which engage said growths in the vicinity of the stalk, and means for imparting rotary motion to said rotating severing means.

References Cited

UNITED STATES PATENTS

| | | | |
|---|---|---|---|
| 3,175,561 | 3/1965 | Oldershaw | 130—9.2 XR |
| 3,212,506 | 10/1965 | Hagoplan | 130—30 |
| 2,641,888 | 6/1953 | Grether | 56—126 XR |
| 2,645,893 | 7/1953 | Horst | 56—126 |
| 2,656,667 | 10/1953 | Smith et al. | 130—30 |

ANTONIO F. GUIDA, *Primary Examiner.*

UNITED STATES PATENT OFFICE
CERTIFICATE OF CORRECTION

Patent No. 3,416,536                                        December 17, 1968

Hugh O. Brown

It is certified that error appears in the above identified patent and that said Letters Patent are hereby corrected as shown below:

In the heading to the printed specification, line 3, "Hugo O. Brown" should read -- Hugh O. Brown --.

Signed and sealed this 17th day of March 1970.

(SEAL)
Attest:

Edward M. Fletcher, Jr.                        WILLIAM E. SCHUYLER, JR.
Attesting Officer                                     Commissioner of Patents